Patented Feb. 10, 1948

2,435,744

UNITED STATES PATENT OFFICE 2,435,744

FLAVORING SOLUTIONS

Carlisle G. Hartman, Glendale, Mo.

No Drawing. Application November 6, 1944,
Serial No. 562,254

3 Claims. (Cl. 99—140)

This invention relates to aqueous flavoring solutions; and it has special reference to clear and transparent solutions for imparting flavors to beverages, and to bakery products, as well as to various other edible articles, such as candies, etc.

In making my improved transparent and substantially clear aqueous flavoring solution, I use lauryl meta sodium sulfobenzoate, sometimes designated as "Santomerse B," mixed with essential flavoring oils, and aromatic chemical materials and causing said flavoring oils and aromatic materials to go into solution in and with water. Certain solvents which are miscible both with the flavoring oils and the water, such as the alcohols, when admixed with lauryl meta sodium sulfobenzoate, water, flavoring materials, and essential oils, make possible, facilitate, and speed up the solution of the materials to be solubilized. The lauryl meta sodium sulfobenzoate stabilizes and effects a clear or transparent resulting solution, or a solution with only a slight haze; so that the final result of the proper admixture of said ingredients within permissible ranges of proportions thereof in syrup produces a clear and transparent sugar solution, or a solution with only a very slight haze. This resulting syrup solution, made with lauryl meta sodium sulfobenzoate as a stabilizer, when diluted in the customary and well-known manner as in the use thereof to flavor soda water, will produce transparent and substantially clear aqueous solutions with a minimum tendency toward instability.

It is known that ethyl alcohol has often been used as a vehicle for essential oils in the preparation of flavoring extracts. Disadvantages exist to the use of ethyl alcohol as a vehicle for the essential oils. One disadvantage is that ethyl alcohol is relatively costly; and another disadvantage is that, when used as a vehicle for essential oils in the preparation of flavoring extracts, the result is a clouding and disagreeable, or displeasing haziness; and still another disadvantage is that the resulting flavoring extract produces a variable flavor and effects instability in the product. My new flavoring solution containing lauryl meta sodium sulfobenzoate permits a great reduction in the amount of ethyl alcohol used in any flavoring extract, in many of which I am enabled to dispense entirely with the use of ethyl alcohol.

The use of certain gums, such as acacia and tragacanth, with flavoring oils and water to render them dispersable, as they must be, for use in food products has also been known. Such products, consisting of said gums, flavoring oils and water, are not stable and are not uniform as to flavor. Solutions of said gums, flavoring oils, and water deteriorate in quality either in storage or in the process of shipment. My improved flavoring solution or composition using lauryl meta sodium sulfobenzoate enables me to dispense with the use of gums, when used with and in specific proportions to other indispensable ingredients comprising flavoring materials, water, and an alcohol or alcohols which are miscible both with the flavoring materials and the water; it also overcomes these difficulties and prevents deterioration of the flavoring solution in storage or in shipment.

The oils used as a flavor in my improved flavoring solution may be a mixture of the so-called essential oils, whether natural or synthetic, and various aromatic chemicals capable of use for flavoring purposes. The proportions of these flavoring essential oils and aromatics, and the proportions of lauryl meta sodium sulfobenzoate, and the relative proportions of hydrotropic agents, may be varied within critical ranges according to the nature and specific identity of the aromatic materials used, and according to the desired effect to be attained.

As an example, a flavoring solution suitable for many uses is obtained by admixture of the following ingredients, in about the proportions, by weight, set forth:

|   | Per cent |
|---|---|
| Citrous oils (lemon, lime, orange) | 30 |
| Lauryl meta sodium sulfobenzoate | 25 |
| Water | 25 |
| Propylene glycol | 10 |
| Ethyl alcohol | 10 |

Another example of a suitable flavoring solution including the indispensable lauryl meta sodium sulfobenzoate, and eliminating the use of ethyl alcohol entirely, may be produced by admixture of the following ingredients in about the proportions, by weight, set forth:

|   | Per cent |
|---|---|
| Peppermint oil | 30 |
| Lauryl meta sodium sulfobenzoate | 30 |
| Water | 20 |
| Propylene glycol | 20 |

It should be understood that my improved flavoring solution is capable of a wide variety of uses. It may be used for flavoring the so-called soda waters as well as for flavoring candies, confections, and various other foods and food products. I do not limit myself to the exact proportions of materials specified. The quantity of these materials may be varied as required to obtain the desirable clear and transparent effects of such mixture according to the amount of lauryl meta sodium sulfobenzoate.

I claim:

1. An aqueous flavoring solution for imparting flavors to beverages and edibles, comprising about 25% of lauryl meta sodium sulfobenzoate, about 30% of citrous oil, about 10% of propylene glycol, about 10% of ethyl alcohol, and the balance water for sustaining the aforesaid materials in solution.

2. An aqueous flavoring solution for imparting flavors to beverages and edibles, comprising about 30% of lauryl meta sodium sulfobenzoate, about 30% of peppermint oil, about 20% of propylene glycol, and the balance water for sustaining said materials in solution.

3. A flavoring extract comprising a flavoring oil, an aqueous vehicle including an alcohol or alcohols, the aqueous vehicle containing water approximately 20% to 25% by weight of the whole extract and alcohol approximately 20%, and lauryl meta sodium sulfobenzoate (Santomerse B) therein on the order of 25% to 30%, thereby providing a substantially clear product.

CARLISLE G. HARTMAN.

REFERENCES CITED

The following references are of record in the file of this patent:

UNITED STATES PATENTS

| Number | Name | Date |
|---|---|---|
| 1,010,043 | Gowen | Nov. 28, 1911 |
| 1,384,681 | Smith | July 12, 1921 |
| 2,079,415 | Levinson | May 4, 1937 |
| 2,134,380 | Stange | Oct. 25, 1938 |
| 2,358,947 | Towt | Sept. 26, 1944 |
| 2,359,291 | Gluesenkamp et al. | Oct. 3, 1944 |